United States Patent
Chuang

(10) Patent No.: US 11,949,313 B2
(45) Date of Patent: Apr. 2, 2024

(54) MOTOR MODULE FOR POWERED ROLLER OF CONVEYOR SYSTEM

(71) Applicant: WORLDWIDE LOGISTICS CORPORATION, New Taipei (TW)

(72) Inventor: Kuo-Chieh Chuang, New Taipei (TW)

(73) Assignee: Worldwide Logistics Corporation, New Taipei (TW)

( * ) Notice: Subject to any disclaimer, the term of this patent is extended or adjusted under 35 U.S.C. 154(b) by 527 days.

(21) Appl. No.: 17/171,311

(22) Filed: Feb. 9, 2021

(65) Prior Publication Data

US 2022/0250846 A1 Aug. 11, 2022

(51) Int. Cl.
| H02K 5/04 | (2006.01) |
| H02K 5/00 | (2006.01) |
| H02K 5/02 | (2006.01) |
| H02K 5/15 | (2006.01) |
| B65G 13/06 | (2006.01) |

(52) U.S. Cl.
CPC ............... *H02K 5/04* (2013.01); *H02K 5/00* (2013.01); *H02K 5/02* (2013.01); *H02K 5/15* (2013.01); *B65G 13/06* (2013.01)

(58) Field of Classification Search
CPC . B65G 23/08; H02K 5/04; H02K 5/15; H02K 5/00; H02K 5/02; H02K 5/22; H02K 5/225
USPC .......................................................... 310/89
See application file for complete search history.

(56) References Cited

U.S. PATENT DOCUMENTS

| 3,310,691 | A | 3/1967 | Wilkinson | |
| 5,215,184 | A | 6/1993 | Huber | |
| 5,901,801 | A * | 5/1999 | Toida | H02K 7/116 |
| | | | | 310/71 |
| 9,948,154 | B2 | 4/2018 | Böhm et al. | |
| 2002/0056609 | A1* | 5/2002 | Nakamura | B65G 23/08 |
| | | | | 198/780 |
| 2002/0060140 | A1* | 5/2002 | Fujimoto | H02K 11/33 |
| | | | | 198/788 |
| 2016/0099623 | A1* | 4/2016 | Böhm | H02K 3/522 |
| | | | | 310/43 |

FOREIGN PATENT DOCUMENTS

| CN | 205595953 U | 9/2016 |
| CN | 108988543 A | 12/2018 |
| CN | 109510364 A | 3/2019 |

(Continued)

OTHER PUBLICATIONS

European Patent Office Official Action dated Oct. 20, 2021 for corresponding EPC Application No. 21162800.3.

*Primary Examiner* — Alexander A Singh

(74) *Attorney, Agent, or Firm* — Rosenberg, Klein & Lee

(57) ABSTRACT

A motor module has a bearing base, a stator, a rotor, a fixing base, and a circuit board. The bearing base, the stator, and the fixing base are sequentially and securely mounted to each other. The bearing base has a bearing base casing. The stator has a stator casing. The fixing base has a fixing base casing. Two end surfaces of the stator casing are respectively connected to an end surface of the bearing base casing and an end surface of the fixing base casing. The rotor is rotatably mounted in the stator, and is rotatably mounted through the bearing base. The circuit board is mounted in the fixing base and is electrically connected to the stator.

2 Claims, 4 Drawing Sheets

(56) References Cited

FOREIGN PATENT DOCUMENTS

| CN | 208955835 U | 6/2019 |
|----|-------------|--------|
| DE | 1763613 A1 | 9/1971 |
| DE | 4426106 A1 | 1/1996 |
| TW | 200612643 A | 4/2006 |
| TW | 201935811 A | 9/2019 |
| TW | M612394 U | 5/2021 |

* cited by examiner

MOTOR MODULE FOR POWERED ROLLER OF CONVEYOR SYSTEM

BACKGROUND OF THE INVENTION

1. Field of the Invention

The present invention relates to a motor module, especially to a motor module that is mounted inside a powered roller of a conveyor system and is adapted to drive the powered roller.

2. Description of the Prior Arts

A conveyor system (roller conveyor) has a track. Multiple powered rollers are mounted on the track and are capable of receiving computer signals to rotate or to stop as desired, so that items can be put on the powered rollers to be conveyed under control of the computer.

With reference to FIG. 4, a conveyor system (roller conveyor) has a conveying cylinder 91, two bearing assemblies 92, a coupler 93, and a driving device 94 (motor assembly). The conveying cylinder 91 is adapted to carry and convey the items. The two bearing assemblies 92 are mounted in the conveying cylinder 91 and are located respectively in two ends of the conveying cylinder 91. The coupler 93 and the driving device 94 are mounted in the conveying cylinder 91 and are connected to each other.

Conventionally, the driving device 94 has a driving device cylinder 941, a reduction gearbox (not shown in figures), a bearing base (not shown in figures), a stator (not shown in figures), a rotor (not shown in figures), and a circuit board (not shown in figures). When manufacturing the driving device 94, an operator first inserts the reduction gearbox into the driving device cylinder from an end opening of the driving device cylinder. Then, the operator connects the bearing base, the stator, the rotor, and the circuit board with wires by soldering. After soldering, the operator inserts the soldered parts from the end opening of the driving device cylinder into the driving device cylinder one by one. Especially, during insertion of the soldered parts, the operator must pull back the parts frequently to ensure that the wires are not damaged by over bending or squeezing during the insertion. Finally, the operator seals the end opening of the driving device cylinder and finishes the manufacturing process.

However, because the driving device cylinder has a certain length, the amount of the parts that need to be inserted is large, and during the process, forward insertion and backward pulling are alternately performed to prevent damage to the parts, so the manufacturing process of the driving device consumes lots of time and labor. If the length of the driving device cylinder is too long, which means the parts have to be inserted deeper, the manufacturing process will be more laborious and time-consuming. Further, the abovementioned structure increases the difficulty of subsequent maintenance and replacement of the driving device. To sum up, the conventional structure needs to be improved.

To overcome the shortcomings, the present invention provides a motor module to mitigate or obviate the aforementioned problems.

SUMMARY OF THE INVENTION

The main objective of the present invention is to provide a motor module that combines the bearing base, the stator, the rotor, and the circuit board into a module, and simplifies the manufacturing process by modularizing the parts that are originally independent from one another.

The motor module is adapted to be mounted in a driving device cylinder and is adapted to be connected to a reduction gearbox. The motor module has a bearing base, a stator, a rotor, a fixing base, and a circuit board. The bearing base has a bearing base casing. An outer annular surface of the bearing base casing is adapted to be securely mounted on an inner annular surface of the driving device cylinder. The stator is mounted securely to the bearing base and has a stator casing. An outer annular surface of the stator casing is adapted to be securely mounted on the inner annular surface of the driving device cylinder. An end surface of the stator casing is directly connected to an end surface of the bearing base casing. The rotor is rotatably mounted in the stator, is rotatably mounted through the bearing base, and is adapted to be connected to the reduction gearbox. The fixing base is mounted securely to the stator and has a fixing base casing. An outer annular surface of the fixing base casing is adapted to be securely mounted on the inner annular surface of the driving device cylinder. An end surface of the fixing base casing is directly connected to the other end surface, which is opposite to the bearing base casing, of the stator casing. The circuit board is mounted in the fixing base and is electrically connected to the stator. An outer diameter of the bearing base casing, an outer diameter of the stator casing, and an outer diameter of the fixing base casing are the same.

By the bearing base, the stator, and the fixing base sequentially mounted to each other, and the bearing base casing, the stator casing, and the fixing base casing sequentially and directly connected to each other, the present invention combines the bearing base, the stator, the rotor, and the circuit board into a module, while these parts are independent from each other in the conventional powered roller. Therefore, during manufacturing of the powered roller, only the motor module needs to be inserted into the driving device cylinder, and the bearing base, the stator, the rotor, fixing base, and the circuit board can be installed in the driving device cylinder in one single step. Thus, the present invention reduces the difficulty of manufacturing the powered roller, thereby reducing the time and labor cost of manufacturing.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
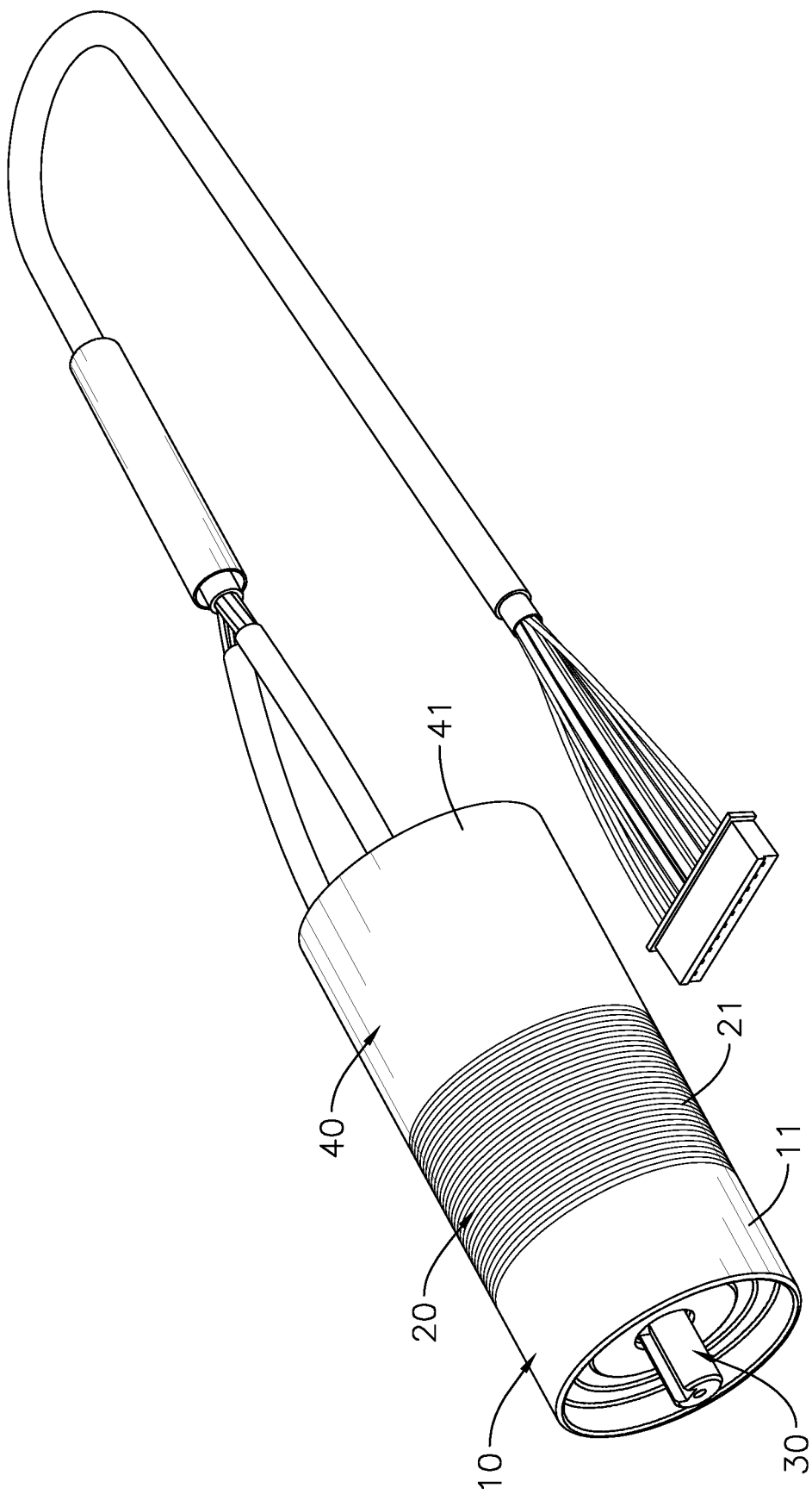
FIG. 1 is a perspective view of a motor module in accordance with the present invention.
Figure 2:
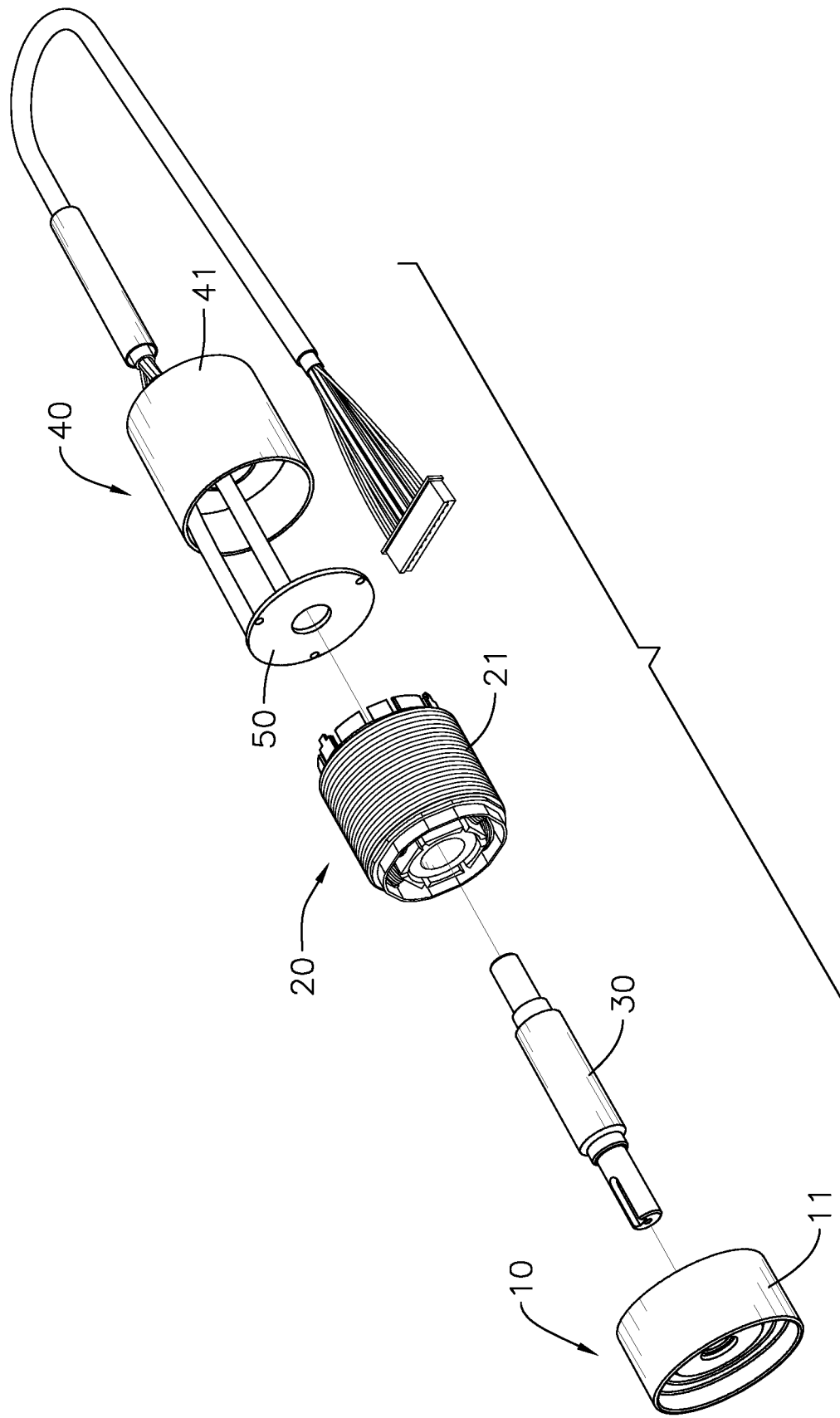
FIG. 2 is an exploded view of the motor module in FIG. 1.
Figure 3:
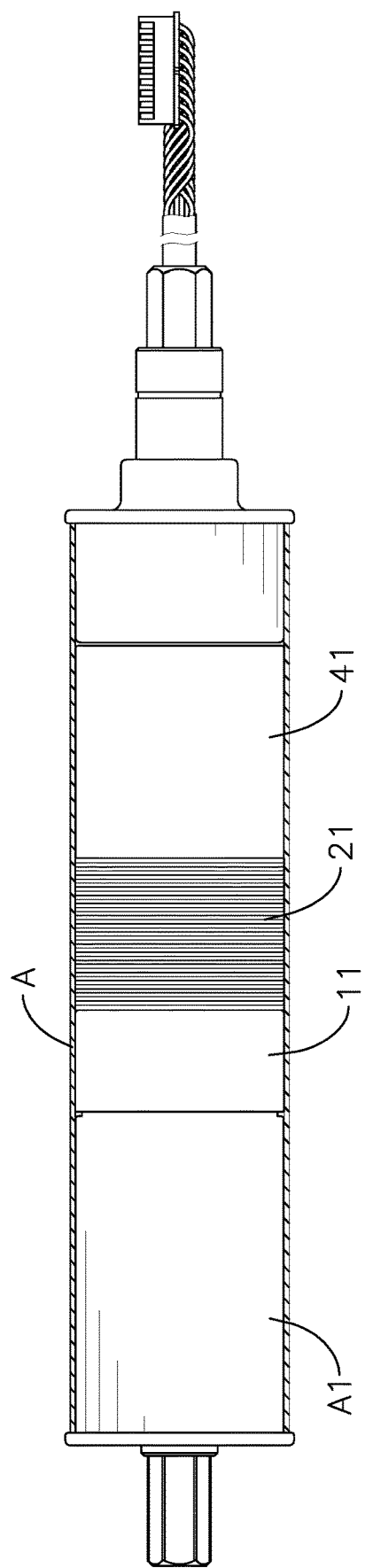
FIG. 3 is a schematic diagram of the motor module in FIG. 1, showing the motor module installed in a driving device cylinder of a driving device of a powered roller.
Figure 4:
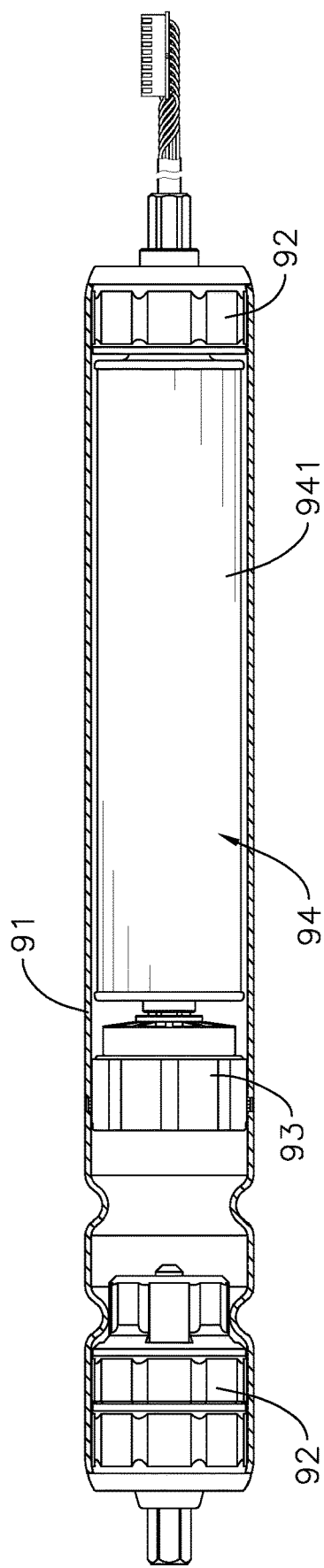
FIG. 4 is a side view in cross-section of a conventional powered roller.

With reference to FIGS. 1, 2, and 3, a motor module in accordance with the present invention is adapted to be mounted in a driving device cylinder A of a driving device of a powered roller, and is adapted to be connected to a reduction gearbox A1. Herein, the driving device will be installed in a conveying cylinder (not shown in figures) and connected to a coupler (not shown in figures), so that the driving device can drive the conveying cylinder to rotate to convey items.

The motor module comprises a bearing base 10, a stator 20, a rotor 30, a fixing base 40, and a circuit board 50.

The bearing base 10 has a bearing base casing 11. In this embodiment, an outer annular surface of the bearing base casing 11 is adapted to tightly fit against an inner annular surface of the driving device cylinder A, which means the whole outer annular surface is tightly fitted in the driving device cylinder A. But in other embodiments, the outer annular surface of the bearing base casing 11 can only be mounted securely on the inner annular surface of the driving device cylinder A instead of having the whole outer annular surface tightly fitted in the driving device cylinder A.

The stator 20 is securely mounted with the bearing base 10 and has a stator casing 21. An end surface of the stator casing 21 is directly connected to an end surface of the bearing base casing 11, and an outer diameter of the stator casing 21 and an outer diameter of the bearing base casing 11 are the same. In this embodiment, an outer annular surface of the stator casing 21 is adapted to tightly fit against the inner annular surface of the driving device cylinder A, but in other embodiments the outer annular surface of the stator casing 21 can only be mounted securely on the driving device cylinder A but not the whole outer annular surface tightly fitted in the driving device cylinder A.

The rotor 30 is rotatably mounted in the stator 20, is rotatably mounted through the bearing base 10, and is connected to the reduction gearbox A1.

The fixing base 40 is securely mounted to the stator 20 and has a fixing base casing 41. An end surface of the fixing base casing 41 is directly connected to the other end surface, which is opposite to the bearing base casing 11, of the stator casing 21, and an outer diameter of the fixing base casing 41 and an outer diameter of the stator casing 21 are the same. In this embodiment, an outer annular surface of the fixing base casing 41 is adapted to tightly fit against the inner annular surface of the driving device cylinder A, but in other embodiments the outer annular surface of the fixing base casing 41 can only be mounted securely on the driving device cylinder A instead of having the whole outer annular surface tightly fitted in the driving device cylinder A.

The circuit board 50 is mounted in the fixing base 40, and is electrically connected to the stator 20.

When manufacturing the driving device of the powered roller, an operator first puts the reduction gearbox A1 into the driving device cylinder A from an end opening of the driving device cylinder A. Then, the operator puts the motor module in the present invention into the driving device cylinder A from the other end opening of the driving device cylinder A, which means the reduction gearbox A1 and the motor module are inserted into the driving device cylinder A respectively from two ends of the driving device cylinder A. When being installed in, the bearing base 10 is faced to the reduction gearbox A1, and a part of the rotor 30 that protrudes out from the bearing base 10 is connected to the reduction gearbox A1. After the motor module is installed, the manufacturing process is done.

By the bearing base 10, the stator 20, and the fixing base 40 sequentially mounted to each other, and the bearing base casing 11, the stator casing 21, and the fixing base casing 41 sequentially and directly connected to each other, the present invention combines the bearing base 10, the stator 20, the rotor 30, the fixing base 40, and the circuit board 50 into a module. Therefore, during manufacturing of the powered roller, only the motor module needs to be inserted into the driving device cylinder A, and the bearing base 10, the stator 20, the rotor 30, the fixing base 40, and the circuit board 50 can be installed in the driving device cylinder in one single step. Besides, the bearing base casing 11, the stator casing 21, and the fixing base casing 41 are adapted to tightly fit against the inner annular surface of the driving device cylinder A, so that the motor module can be installed firmly in the driving device cylinder A. In summary, the present invention reduces the difficulty of manufacturing the powered roller, thereby reducing the time and labor cost of manufacturing.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A motor module adapted to be mounted in a driving device cylinder and adapted to be connected to a reduction gearbox; the motor module comprising:
   a bearing base having
      a bearing base casing; an outer annular surface of the bearing base casing adapted to be securely mounted on an inner annular surface of the driving device cylinder;
   a stator mounted securely to the bearing base and having
      a stator casing; an outer annular surface of the stator casing adapted to be securely mounted on the inner annular surface of the driving device cylinder; an end surface of the stator casing directly connected to an end surface of the bearing base casing;
   a rotor rotatably mounted in the stator, rotatably mounted through the bearing base, and adapted to be connected to the reduction gearbox;
   a fixing base mounted securely with the stator and having
      a fixing base casing; an outer annular surface of the fixing base casing adapted to be securely mounted on the inner annular surface of the driving device cylinder; an end surface of the fixing base casing directly connected to the other end surface, which is opposite to the bearing base casing, of the stator casing; and
   a circuit board mounted in the fixing base and electrically connected to the stator;
   wherein an outer diameter of the bearing base casing, an outer diameter of the stator casing, and an outer diameter of the fixing base casing are the same.

2. The motor module as claimed in claim 1, wherein
   the outer annular surface of the bearing base casing is adapted to tightly fit against the inner annular surface of the driving device cylinder;
   the outer annular surface of the stator casing is adapted to tightly fit against the inner annular surface of the driving device cylinder; and
   the outer annular surface of the fixing base casing is adapted to tightly fit against the inner annular surface of the driving device cylinder.

* * * * *